United States Patent Office 3,639,416
Patented Feb. 1, 1972

3,639,416
PROCESS FOR THE PREPARATION OF BIS-ISOXAZOLINE
Daniel Batigne, Villeurbanne, and Jacques Boichard, Michel Gay, and Raymond Janin, Lyon, France, assignors to Rhone-Poulenc S.A., Paris, France
No Drawing. Filed Mar. 4, 1968, Ser. No. 710,401
Claims priority, application France, Mar. 16, 1967, 99,101; Mar. 1, 1968, 142,055
Int. Cl. C07d 85/16
U.S. Cl. 260—307      3 Claims

ABSTRACT OF THE DISCLOSURE

Bis-3,3'-isoxazoline is made by oxidizing ethylene in an aqueous medium with nitric acid or a nitrogen oxide.

---

The present invention relates to the preparation of bis-3,3'-isoxazoline.

U.S. patent specification No. 3,148,193 describes a process for the preparation of bis-3,3'-isoxazolines, in particular bis-3,3'-isoxazoline itself of formula:

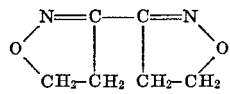

by reacting a dihaloglyoxime, such as dichloroglyoxime or dibromoglyoxime, with ethylene in the presence of an acceptor for a hydrogen-containing acid, such as a tertiary amine, in an inert solvent and at a temperature between 0 and 50° C. Using this process, the yield of bis-3,3'-isoxazoline does not exceed 12.5% based on the dihaloglyoxime.

Bednowitz et al. (Acta Cryst. 16 A 62 (1963) and Acta Cryst. 20 (1) 100–104 (1966)) have observed the presence of bis-3,3'-isoxazoline amongst the by-products of the reaction of nitrogen peroxide with ethylene in carbon tetrachloride, according to the process described by Levy et al. (J. Chem. Soc. (1946), p. 1096 to 1100).

It has now been found that bis-3,3'-isoxazoline is obtained in considerably higher yields than those of the processes described previously, by a process which comprises heating ethylene under pressure in an aqueous medium with nitric acid, or a nitrogen oxide in which the nitrogen has a valency of at least 3, or both. The temperature should be between 40 and 150° C.

The concentration of nitric acid or nitrogen oxide in the aqueous medium may vary within quite wide limits, but is preferably between 1 and 40% by weight.

The ethylene pressure is higher than atmospheric pressure but preferably lower than the liquifaction pressure of ethylene at the temperature used. The initial ratio of ethylene to nitric acid or nitrogen oxides is immaterial as excess of either starting material is readily separated from the desired product. Generally, however, from 1 to 5 moles of nitric acid or nitrogen oxide are used per mole of ethylene.

The ethylene used may contain saturated hydrocarbons such as ethane and does not have to be specially purified.

The new process is promoted by the presence in the reaction medium of catalysts based on certain metals or metal derivatives which are soluble in the reaction medium, where appropriate after reaction with the nitric acid present in the medium. The metal used may be nickel, cobalt, iron, copper or zinc. It may be in the form of either the free metal or a metal derivative which is soluble in nitric acid. Salts of organic acids, salts of inorganic acids such as chlorides, sulphates, phosphates and especially nitrates, hydroxides or oxides, or complexes of these metals may be used. Nickel nitrate is preferred. The amount of catalyst added to the reaction medium is not critical, but the amount of catalyst generally represents (expressed as metal) 0 to 5% of the weight of the reaction mixture.

In order to carry out the new process the nitric acid and, where appropriate, the catalyst are introduced into a pressure-resistant apparatus and then, after closing the apparatus, the ethylene is introduced at the selected pressure. The mixture is then heated to a suitable temperature. The bis-3,3'-isoxazoline product is recovered by extraction with a solvent after neutralising the reaction medium, and then subjected to the usual purification treatments.

On hydrogenation, bis-3,3'-isoxazoline is converted into 3,4-diamino-hexanediol-1,6, which may be used to obtain polycondensates capable of cross-linking, or may be used as a complexing agent.

The following examples illustrate the invention.

EXAMPLE 1

120.3 g. of 20% strength nitric acid (0.382 mol of HNO₃) are introduced into a 500 cm.³ stainless steel autoclave equipped with an impact-type agitation device. The autoclave is then closed and ethylene introduced up to a pressure of 22 bars, corresponding to 0.171 mol of ethylene. The temperature of the reaction mixture is raised to 80° C., and the mixture kept at this temperature for 5 hours 25 minutes with agitation. The agitation is then stopped and the reaction mixture cooled to 15° C. The gases are released from the autoclave and collected for analysis. 0.028 mol of ethylene is recovered, so that the amount of ethylene consumed is 0.143 mol.

The reaction mixture is extracted with 5 lots of 100 cm.³ each of diethyl ether after being neutralized to pH 7 with sodium hydroxide solution. The resulting combined ethereal solutions are concentrated to 150 cm.³. On cooling, the precipitate obtained is filtered off. 1.40 g. of a white product, having a melting point of 172° C. as determined by differential thermal analysis, and identified by percentage analysis and infra-red, ultra-violet and nuclear magnetic resonance spectra as bis-3,3'-isoxazoline, are thus obtained. The yield, based on the ethylene consumed, is 21%.

EXAMPLE 2

19.8 g. of nitrogen peroxide (i.e. 0.430 mol of NO₂) and 220 g. of water are introduced into the autoclave used in Example 1. The autoclave is then closed and ethylene introduced up to a pressure of 25 bars, i.e. 0.310 mol (8.7 g.). The contents of the autoclave are heated to 80° C. with agitation and kept under these conditions for 6 hours, and then cooled to ambient temperature. Determination of the ethylene in the residual gas indicates an ethylene consumption of 0.22 mol. The reaction mixture is worked up as in Example 1, and 4.17 g., i.e. 29.8 mmols, of bis-3,3'-isoxazoline are isolated. The yield based on the ethylene consumed is 41%.

EXAMPLE 3

30 g. of 63% strength nitric acid, 3 g. of $$Ni(NO_3)_2 \cdot 6H_2O$$

and 67 g. of water are introduced into a 250 cm.³ stainless steel autoclave equipped as in Example 1. The autoclave is closed and 6 g. (i.e. 214 mmols) of ethylene are then introduced, bringing the total pressure to 25 bars. The contents of the autoclave are heated to 80° C., and the reaction mixture is left under these conditions for 30 minutes. The contents of the autoclave are then cooled to ambient temperature, and the gases are released from the autoclave and collected for analysis. 79 mmols of ethylene are recovered. After the reaction mixture has been worked up as in Example 1. 1.95 g. (i.e. 13.95 mmols) of bis-3,3'-isoxazoline are isolated.

Bis-3,3'-isoxazoline is simalarly obtained if the 3 g. of nickel nitrate are replaced by an equimolecular quantity of zinc nitrate, copper nitrate, iron nitrate, or cobalt nitrate.

EXAMPLE 4

6.7 g. of nitrogen peroxide, 112.2 g. of water and 1.4 g. of $Ni(NO_3)_2$ are introduced into the autoclave used in Example 1. The autoclave is then closed and ethylene introduced up to a pressure of 20 bars. Agitation is started and the temperature of the contents of the autoclave raised to 80° C. within 35 minutes. This temperature is maintained for 5 hours 25 minutes and the reaction mixture is then cooled to ambient temperature. The reaction mixture is worked up as in Example 1. 0.064 mol of ethylene is consumed. 1.522 g. (i.e. 10.9 mmols), of bis-3,3'-isoxazoline are isolated. The yield, based on the ethylene consumed is 51%.

We claim:

1. Process for the preparation of bis-3,3'-isoxazoline which comprises heating ethylene at 40–150° C. at a pressure above atmospheric pressure but below the liquification pressure of ethylene at the operating temperature in an aqueous medium with nitric acid or nitrogen peroxide or both, and isolating the bis-3,3'-isoxazoline produced.

2. Process according to claim 1 in which the aqueous medium contains, as catalyst, nickel ions in an amount (expressed as metal) up to 5% by weight of the reaction mixture.

3. Process for the production of bis-3,3'-isoxazoline which comprises heating ethylene at 40 to 150° C. at a pressure above atmospheric pressure but below the liquification pressure of ethylene at the operating temperature in an aqueous medium containing nickel nitrate, with nitric acid or nitrogen peroxide or both, and isolating the bis-3,3'-isoxazoline produced.

References Cited

UNITED STATES PATENTS 2,855,402  10/1958  Cramer _____ 260—307

ALLEX MAZEL, Primary Examiner

R. V. RUSH, Assistant Examiner

260—584 R

U.S. Cl. X.R.